(12) United States Patent
Wu et al.

(10) Patent No.: US 11,394,853 B2
(45) Date of Patent: Jul. 19, 2022

(54) IMAGE REPRESENTATION METHOD, IMAGE REPRESENTATION DEVICE, AND COMPUTER READABLE STORAGE MEDIUM

(71) Applicant: BOE Technology Group Co., Ltd., Beijing (CN)

(72) Inventors: Yanhong Wu, Beijing (CN); Hanwen Liu, Beijing (CN); Lijie Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/910,340

(22) Filed: Jun. 24, 2020

(65) Prior Publication Data

US 2021/0097903 A1     Apr. 1, 2021

(30) Foreign Application Priority Data

Sep. 29, 2019   (CN) .......................... 201910935969.0

(51) Int. Cl.
| | |
|---|---|
| *H04N 1/60* | (2006.01) |
| *G09G 3/20* | (2006.01) |
| *G09G 5/02* | (2006.01) |
| *G02F 1/167* | (2019.01) |
| *G09F 9/37* | (2006.01) |

(52) U.S. Cl.
CPC .............. *H04N 1/60* (2013.01); *G09G 5/026* (2013.01); *G02F 1/167* (2013.01); *G09F 9/372* (2013.01)

(58) Field of Classification Search
CPC .......... G09G 5/026; G09G 5/02; G09G 3/344; G09G 3/38; G09G 3/2003; G02F 1/167; H04N 1/60; H04N 1/6019; H04N 1/6058; G09F 9/372
See application file for complete search history.

(56) References Cited

U.S. PATENT DOCUMENTS

| | | | |
|---|---|---|---|
| 6,753,988 B1* | 6/2004 | Eldredge | H04N 1/6019 358/518 |
| 7,586,644 B2* | 9/2009 | Walton | H04N 1/40 358/1.9 |
| 2002/0063719 A1* | 5/2002 | Ziobro | H04N 1/40012 345/582 |

* cited by examiner

*Primary Examiner* — Xuemei Zheng
(74) *Attorney, Agent, or Firm* — Nath, Goldberg & Meyer; Joshua B. Goldberg (57) ABSTRACT

There is provided an image representation method, including: converting a to-be-converted image from a first color space to a second color space; acquiring a target conversion color ratio corresponding to each pixel of the to-be-converted image and including ratios of plural target conversion colors, according to a color ratio allocation table based on the second color space; creating an array corresponding to the pixel according to the target conversion color ratio; calculating an index value corresponding to the pixel according to a position of the pixel in the to-be-converted image, and inputting the index value to the array as a subscript of the array, to acquire an element of the array as a target value corresponding to the pixel; and determining a target conversion color of the pixel according to the target value, to acquire a converted image including the plural target conversion colors.

13 Claims, 6 Drawing Sheets

FIG. 9 array Text having N elements = {Text[0], Text[1], Text[2], ..., Text[110], ..., Text[145], ..., Text[198], Text[199]}
= {a, a, ..., a, b, b, ..., b, c, c, ..., c}, where the numbers of the constants a, the constants b, and the constants c in the array corresponding to each pixel are Ratio[H][S][V][a] * N, Ratio[H][S][V][b] * N, and Ratio[H][S][V][c] * N, respectively, and for example, a = 0, b = 1, c = 2.

IMAGE REPRESENTATION METHOD, IMAGE REPRESENTATION DEVICE, AND COMPUTER READABLE STORAGE MEDIUM

CROSS REFERENCE TO RELATED APPLICATIONS

The present disclosure claims the priority of Chinese patent application No. 201910935969.0, filed on Sep. 29, 2019, the content of which is hereby incorporated herein in its entirety by reference.

TECHNICAL FIELD

The present disclosure relates to the field of image processing technologies, and in particular, to an image representation method, an image representation device, and a non-transitory computer readable storage medium.

BACKGROUND

An electronic ink screen (i.e., an electronic ink display panel), also known as electronic paper, is a screen that employs electronic ink. The electronic ink screen has the advantages of low power consumption, foldability, flexibility, fine and smooth picture display, wide visual angle, no dead angle in the sun, and the like.

SUMMARY

Embodiments of the present disclosure provide an image representation method, an image representation device, and a non-transitory computer readable storage medium.

A first aspect of the present disclosure provides an image representation method, including:

converting a to-be-converted image from a first color space to a second color space;

acquiring a target conversion color ratio corresponding to each pixel of the to-be-converted image, according to a color ratio allocation table based on the second color space, the target conversion color ratio corresponding to the pixel of the to-be-converted image including ratios of a plurality of target conversion colors;

creating an array corresponding to the pixel according to the target conversion color ratio corresponding to the pixel;

calculating an index value corresponding to the pixel according to a position of the pixel in the to-be-converted image, and inputting the calculated index value to the created array corresponding to the pixel as a subscript of the array corresponding to the pixel, to acquire an element of the array corresponding to the pixel as a target value corresponding to the pixel; and determining the target conversion color of the pixel according to the acquired target value corresponding to the pixel of the to-be-converted image, to acquire a converted image including the plurality of target conversion colors and corresponding to the to-be-converted image.

In an embodiment, the calculating an index value corresponding to the pixel according to a position of the pixel in the to-be-converted image as a subscript of the array corresponding to the pixel includes:

calculating a first intermediate result according to a coordinate of the pixel in the to-be-converted image, and then performing a modulus operation by taking the first intermediate result as a dividend and taking N as a divisor to acquire the index value corresponding to the pixel as the subscript of the array corresponding to the pixel, where N is a length of the array corresponding to the pixel.

In an embodiment, the calculating a first intermediate result according to a coordinate of the pixel in the to-be-converted image includes:

acquiring the first intermediate result by calculating $(\alpha*x+\beta*y)$, where x and y represent row and column coordinates, respectively, of the pixel of the to-be-converted image, $\alpha$ and $\beta$ are hyper-parameters, and values of $\alpha$, $\beta$ and N are in a same order of magnitude.

In an embodiment, the image representation method further includes:

storing constants of a plurality of types in the array corresponding to the pixel, wherein the constant of each type represents one of the target conversion colors and include a plurality of constants, the constants of a same type represent a same target conversion color, and the constants of different types each represent a corresponding target conversion color; and wherein in the array corresponding to the pixel, a ratio of a number of the constants of one type to a total number of the constants of the plurality of types is the same as a ratio of the target conversion color corresponding to the constants of the one type to the plurality of target conversion colors.

In an embodiment, a constant a, a constant b and a constant c are stored in the array corresponding to the pixel, where the constant a represents red, the constant b represents white, and the constant c represents black; and determining the target conversion color of the pixel according to the acquired target value corresponding to the pixel of the to-be-converted image, to acquire a converted image including the plurality of target conversion colors and corresponding to the to-be-converted image includes:

determining that a color of a pixel of the converted image corresponding to the pixel of the to-be-converted image is red, white or black in a case where the target value corresponding to the pixel of the to-be-converted image is the constant a, the constant b or the constant c, respectively, to acquire the converted image including red, white and black.

In an embodiment, the first color space is an RGB color space, and the second color space is an HSV color space.

In an embodiment, in the color ratio allocation table, a sum of the ratios of the plurality of target conversion colors included in the target conversion color ratio corresponding to the pixel of the to-be-converted image is 1.

In an embodiment, the color ratio allocation table is an HSV color ratio allocation table; and a method for creating the HSV color ratio allocation table includes:

calculating a plurality of target conversion color ratios corresponding to different values of Hue H in a case where Saturation S and Value V are set as S=255, and V=255;

calculating a plurality of target conversion color ratios corresponding to different values of Saturation S according to the calculated plurality of target conversion color ratios corresponding to different values of Hue H, in a case where Value V is set as V=255; and calculating a plurality of target conversion color ratios corresponding to different values of Value V according to the calculated plurality of target conversion color ratios corresponding to different values of Saturation S.

In an embodiment, the target conversion color ratio corresponding to the pixel of the to-be-converted image includes ratios of three colors of red, white and black; and the plurality of target conversion color ratios corresponding to different values of Hue H are calculated according to the following set of formulas:

$0 \leq H < 30$, Ratio$[H][255][255][0]=1-H/29$, Ratio$[H][255][255][1]=H/29$, Ratio$[H][255][255][2]=0$;

$30 \leq H < 60$, Ratio$[H][255][255][0]=0$, Ratio$[H][255][255][1]=1-(H-30)/29$, Ratio$[H][255][255][2]=(H-30)/29$;

$60 \leq H < 90$, Ratio$[H][255][255][0]=0$, Ratio$[H][255][255][1]=(H-60)/29$, Ratio$[H][255][255][2]=1-(H-60)/29$;

$90 \leq H < 120$, Ratio$[H][255][255][0]=0$, Ratio$[H][255][255][1]=1-(H-90)/29$, Ratio$[H][255][255][2]=(H-90)/29$;

$120 \leq H < 150$, Ratio$[H][255][255][0]=0$, Ratio$[H][255][255][1]=(H-120)/29$, Ratio$[H][255][255][2]=1-(H-120)/29$;

$150 \leq H < 180$, Ratio$[H][255][255][0]=(H-150)/29$, Ratio$[H][255][255][1]=1-(H-150)/29$, Ratio$[H][255][255][2]=0$;

where Ratio[H][255][255][0], Ratio[H][255][255][1] and Ratio[H][255][255][2] represent the ratios of red, white, and black, respectively, when H=i, S=255, and V=255, and i∈[0, 180) and is a positive integer.

In an embodiment, the plurality of target conversion color ratios corresponding to different values of Saturation S are calculated according to the following set of formulas:

Ratio$[H][S][255][0]$=Ratio$[H][255][255][0]*S/255$, Ratio$[H][S][255][1]$=Ratio$[H][255][255][1]*S/255+(1-S/255)$, Ratio$[H][S][255][2]$=Ratio$[H][255][255][2]*S/255$;

where Ratio[H][S][255][0], Ratio[H][S][255][1] and Ratio[H][S][255][2] represent the ratios of red, white and black, respectively, when H=i, S=j, V=255, and i∈[0, 180), j∈[0, 255], and i, j are positive integers.

In an embodiment, the plurality of target conversion color ratios corresponding to different values of Value V are calculated according to the following set of formulas:

Ratio$[H][S][V][0]$=Ratio$[H][S][255][0]*V/255$, Ratio$[H][S][V][1]$=Ratio$[H][S][255][1]*V/255$, Ratio$[H][S][V][2]$=Ratio$[H][S][255][2]*V/255+(1-V/255)$;

where Ratio[H][S][V][0], Ratio[H][S][V][1] and Ratio[H][S][V][2] represent the ratios of red, white and black, respectively, when H=i, S=j, V=k, and i∈[0, 180), j∈[0, 255], k∈[0, 255], and i, j, k are positive integers.

A second aspect of the present disclosure provides an image representation device, including:

one or more processors; and a memory for storing one or more programs, wherein the one or more programs, when executed by the one or more processors, cause the one or more processors to implement the image representation method according to any one of the embodiments of the first aspect of the present disclosure.

A third aspect of the present disclosure provides a non-transitory computer readable storage medium having a computer program stored therein, wherein the computer program, when executed by a processor, implements the image representation method according to any one of the embodiments of the first aspect of the present disclosure.

BRIEF DESCRIPTION OF THE DRAWINGS

In order to more clearly describe embodiments of the present disclosure or technical solutions in the related art, the drawings used in the description of the embodiments or the related art will be briefly described below. It should be apparent that the drawings in the following description are merely some examples of the present disclosure and that modifications may be made therein by one of ordinary skill in the art to derive additional drawings without any inventive effort.

Part a of FIG. 2 shows a to-be-converted image, part b of FIG. 2 shows a converted image when a target value is determined by using a random number, and part c of FIG. 2 shows a converted image when a target value is determined by using a method, which includes a modulus operation according to coordinates of pixels, according to an embodiment of the present disclosure.

Part a of FIG. 3 is a schematic diagram showing an RGB color space, and part b of FIG. 3 is a schematic diagram showing an HSV color space.

Part a of FIG. 5 shows original colors, and part b of FIG. 5 shows a three-color image, which includes red, white, and black, corresponding to the original colors.

Part a of FIG. 7 is a schematic color diagram of the HSV color space, and part b of FIG. 7 illustrates ratio allocations of red, white, and black corresponding to the HSV color space and acquired by using a method for creating an HSV color ratio allocation table according to an embodiment of the present disclosure.

Parts a1 to a3 of FIG. 9 are to-be-converted images, and parts b1 to b3 of FIG. 9 are converted images respectively corresponding to parts a1 to a3 of FIG. 9 and acquired by using an image representation method according to an embodiment of the present disclosure.

DETAILED DESCRIPTION

Technical solutions according to embodiments of the present disclosure will be clearly and fully described below with reference to the accompanying drawings. It is to be understood that the following described embodiments are for purposes of illustration only and should not be construed as limitation of the present disclosure. All variations and modifications of the described embodiments of the present disclosure acquired by one of ordinary skill in the art without any inventive effort also fall within protection scope of the present disclosure.

The terms "first", "second", and the like, used herein are solely for the purpose of distinguishing identical or similar items that are substantially the same in function and effect, but are not for the purpose of limiting the number, order, or importance of the identical or similar items.

In an electronic ink screen (i.e., an electronic ink display panel) and a display device including the electronic ink screen, it is necessary to convert a color image into an image having two colors (for example, an image having two colors of black and white). Generally, such a conversion is completed by using a threshold to perform binarization on an image (i.e., perform image binarization), so as to realize display of a two-color image. In order to constantly develop display technologies to improve user experience, technicians are researching the conversion of a color image into a three-color image (e.g., an image with three colors of red, white and black) to realize colorized display of the electronic ink screen. If the color image is directly converted into a three-color image according to two thresholds, a large area of a resultant image will have a same color, such that visual information contained in the original image may be seriously damaged, thereby degrading the display effect and deteriorating the user experience.

Figure 1:
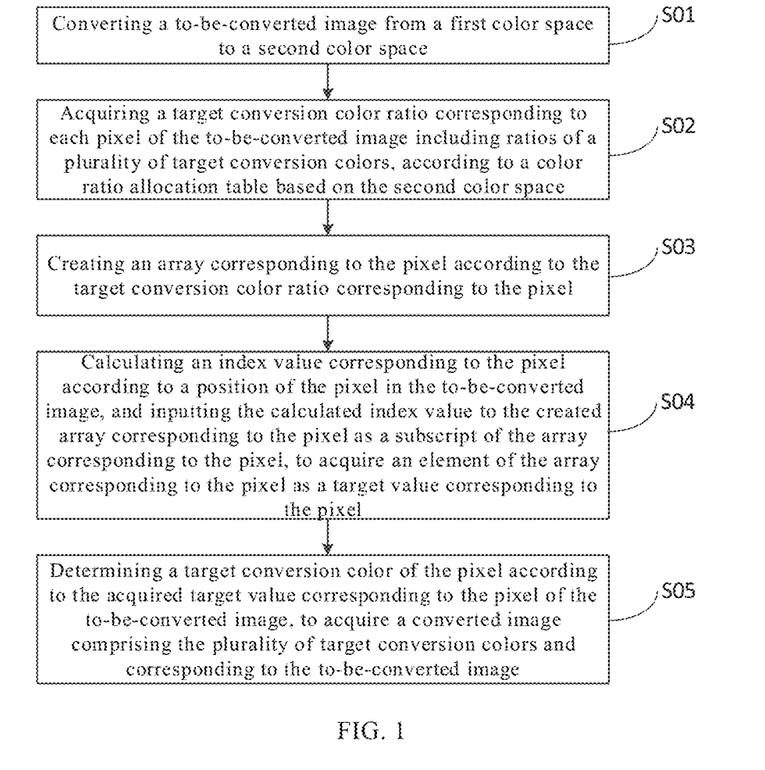
FIG. 1 shows a schematic flowchart of an image representation method according to an embodiment of the present disclosure.

An embodiment of the present disclosure provides an image representation method. As shown in FIG. 1, the image representation method may include the following steps S01 to S05.

In step S01, a to-be-converted image is converted from a first color space to a second color space.

Size, display content, format and the like of the to-be-converted image are not limited herein. In some embodiments, the to-be-converted image may be in a BMP (bitmap) format, a JPEG (Joint Photographic Experts Group) format, a TGA (Tagged Graphics) format, a TIFF (Tag Image File Format) format, and the like, but the present disclosure is not limited thereto.

The first color space of the to-be-converted image may be an RGB (Red, Green, Blue) color space, an HSV (Hue, Saturation, Value) color space, an HSI (Hue, Saturation, Intensity) color space, or the like, and the second color space of the to-be-converted image may also be an RGB color space, an HSV color space, an HSI color space, or the like. However, the present disclosure is not limited thereto, as long as the second color space is different from the first color space.

It should be noted that, in the following steps S02 to S05, the to-be-converted image and pixels of the to-be-converted image may refer to the to-be-converted image having been converted into the second color space (which may be referred to as an intermediate image) and pixels of the to-be-converted image having been converted into the second color space, respectively.

In step S02, a target conversion color ratio corresponding to each pixel of the to-be-converted image is acquired, according to a color ratio allocation table based on the second color space.

A specific allocation method for the color ratio allocation table is not limited herein, as long as the color ratio allocation table includes the target conversion color ratio corresponding to each pixel of the to-be-converted image.

The meanings of the color ratio allocation table and the target conversion color ratio are explained below. When the to-be-converted image is converted from a color image to an image having a plurality of colors (each of the plurality of colors is a target conversion color), the color ratio allocation table includes at least allocated ratios of the plurality of colors (i.e., the target conversion color ratio) corresponding to each pixel of the to-be-converted image. That is, the target conversion color ratio includes the allocated ratios of the plurality of colors, and the allocated ratios of the plurality of colors include a ratio of each of the plurality of colors to the plurality of colors. In other words, during conversion of the to-be-converted image from the color image to the image having the plurality of colors, the target conversion color ratio corresponding to each pixel of the to-be-converted image includes: during conversion of the pixel, a ratio of each of the plurality of colors to the plurality of colors for the pixel. The ratio of one color of the plurality of colors to the plurality of colors may be hereinafter simply referred to as the ratio of the one color, and for example, a ratio of red to a plurality of colors (e.g., red, white, and black) may be simply referred to as a ratio of red. In some embodiments, a sum of the ratios of the respective colors the plurality of colors may be 1, but the present disclosure is not limited thereto. The image having the plurality of colors (hereinafter may be simply referred to as a "multicolor image") may be a three-color (e.g., red, white, and black) image, a four-color image, or an image having more colors.

In step S03, an array corresponding to each pixel is created according to the target conversion color ratio corresponding to the pixel.

A specific method for creating the array corresponding to each pixel according to the target conversion color ratio corresponding to the pixel is not limited herein, and specific content to be stored in the array is not limited herein.

In step S04, an index value corresponding to each pixel is calculated according to a position of the pixel in the to-be-converted image, and the calculated index value is input to the created array corresponding to the pixel as a subscript of the array corresponding to the pixel, to acquire an element of the array corresponding to the pixel as a target value corresponding to the pixel.

A specific algorithm for calculating the subscript of the array corresponding to each pixel according to the position of the pixel in the to-be-converted image is not limited herein.

In step S05, a color of a pixel of a converted image corresponding to each pixel of the to-be-converted image is determined according to the acquired target value corresponding to the pixel of the to-be-converted image, to acquire the converted image (i.e., a multicolor image). The color of a pixel of the converted image corresponding to each pixel of the to-be-converted image may be simply referred to hereinafter as a "target conversion color" of the pixel of the to-be-converted image.

A specific kind of the target conversion color is not limited herein. In some embodiments, the target conversion color may be red, white, black, yellow, or the like. For example, when the multicolor image includes red, white, and black, the target conversion color may be red, white, or black.

As described above, the embodiment of the present disclosure provides an image representation method in which ratios of respective target conversion colors (i.e., the respective colors the plurality of colors) are allocated for each pixel of the to-be-converted image by using the color ratio allocation table; an array corresponding to each pixel of the to-be-converted image is created based on the target conversion color ratio corresponding to the pixel; an index value corresponding to each pixel of the to-be-converted image is calculated according to a position of the pixel in the to-beconverted image, and an element of the array corresponding to the pixel is acquired as a target value corresponding to the pixel, by using the calculated index value as a subscript of the array corresponding to the pixel; a target conversion color of each pixel is determined according to the acquired target value corresponding to the pixel, so as to finally acquire the converted image. By the image representation method which includes the steps of introducing the target conversion color ratio and acquiring the subscript of the array through a modulus operation, a large area of the converted image having a same color can be greatly reduced, and visual information contained in the original image can be more retained. Therefore, the image representation method according to the embodiment of the present disclosure improves the display effect and the user experience. The image representation method may be applied to digital image processing, an application employing an electronic ink screen, and the like.

In some embodiments, the calculating an index value corresponding to each pixel according to a position of the pixel in the to-be-converted image as a subscript of the created array corresponding to the pixel in the step S04 may include that: a first intermediate result is calculated according to a coordinate of each pixel of the to-be-converted image, and then performing a modulus operation by taking the first intermediate result as a dividend and taking N as a divisor to acquire an index value corresponding to the pixel as a subscript of the array corresponding to the pixel, where N is the length of the array.

Here, the concept of the known modulus operation is explained. For a positive integer p and an integer a, a modulus operation in which a is a dividend and p is a divisor may be expressed as: a % p (or a mod p), and means to find a remainder after a is divided by p, i.e., the result of the modulus operation in which a is a dividend and p is a divisor is the remainder after a is divided by p.

A specific algorithm for calculating the first intermediate result according to the coordinate of each pixel in the to-be-converted image is not limited herein. In some embodiments, calculating the first intermediate result according to the coordinate of each pixel in the to-be-converted image may include: acquiring the first intermediate result by calculating ($\alpha$*x+$\beta$*y), where x and y are respectively a row coordinate and a column coordinate of each pixel in the to-be-converted image, that is, the coordinate of the pixel in the to-be-converted image is (x, y), and the pixel is located in the x-th row and y-th column of the to-be-converted image; $\alpha$ and $\beta$ are parameters set in advance, and values of $\alpha$, $\beta$, and N are in a same order of magnitude. In some embodiments, $\alpha$ and $\beta$ are hyperparameters, which are parameters that need to be manually set in advance.

Figure 2:
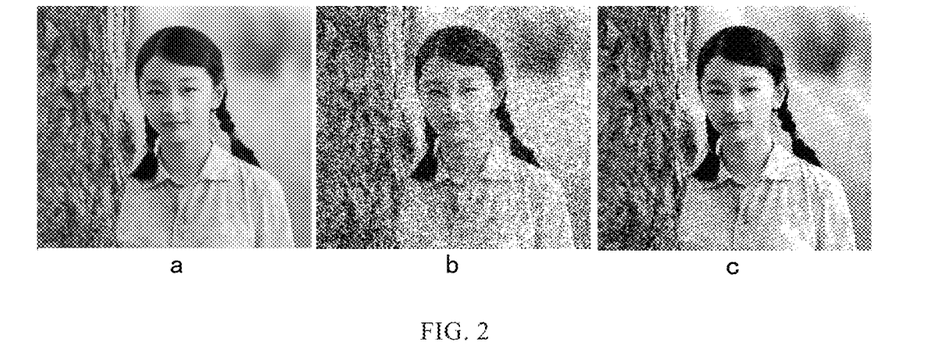

As shown in parts a to c of FIG. 2, if only a random number is used for determining the target value corresponding to each pixel, the to-be-converted image shown in part a of FIG. 2 will be converted into the image having more noise as shown in part b of FIG. 2. However, when the target value corresponding to each pixel is determined by the method, which includes performing the modulus operation according to the coordinate of the pixel, according to the embodiment of the present disclosure, the to-be-converted image shown in part a of FIG. 2 can be converted into the image having less noise as shown in part c of FIG. 2. The first intermediate result is calculated according to the coordinate of each pixel, and then the modulus operation is carried out by taking the first intermediate result and N as a dividend and a divisor, respectively, to acquire the index value corresponding to the pixel as the subscript of the array corresponding to the pixel. Finally, the acquired subscript of the array corresponding to the pixel is input into the array corresponding to the pixel, to acquire the element of the array corresponding to the pixel as the target value corresponding to the pixel. In this way, a certain degree of randomness is introduced into orderliness, and the finally resulting converted image has the advantages of less noise and the like.

N, $\alpha$, and $\beta$ each having a constant value may be applied to images of various sizes and various resolutions (e.g., an oversized image with an 8K resolution and a thumbnail with a 32×32 resolution). In some embodiments, a multicolor image converted from a color image may have excellent quality when N=200, $\alpha$=125, and $\beta$=113.

The array corresponding to each pixel created in step S03 will be described in detail below.

In some embodiments, each array may store a plurality of types of constants which are in one-to-one correspondence with respective colors of the multicolor image. That is, the elements of the array may be constants, each type of constant may represent one target conversion color and include a plurality of constants, constants of a same type may represent a same target conversion color, and different types of constants each may represent a corresponding target conversion color. In some embodiments, in the array corresponding to each pixel, a ratio of the number of the constants of one type (for example, the constants a as described below) to the total number of constants of respective types is the same as the ratio of the target conversion color corresponding to the constants of the one type to the respective colors. The ratio of the number of the constants of one type to the total number of constants of respective types may be simply referred to as the ratio of the constants of the one type (for example, the ratio of the constants a as described below).

It should be noted that the sequence of the plurality of types of constants stored in each array, that is, the subscripts of the array corresponding to the plurality of types of constants respectively, may be random or preset.

Storing constants in an array will be described below by way of example. When a to-be-converted image is converted from a color image to a three-color image including three colors of red, white and black, each array stores three types of constants a, b and c, where the constants a, b and c represent red, white and black, respectively. In the case where the second color space is the HSV color space and the color ratio allocation table of the second color space is a HSV color ratio allocation table, assuming that the ratio of red, the ratio of white, and the ratio of black corresponding to values of H, S and V of each pixel of the to-be-converted image in the HSV color space are Ratio[H][S][V][a], Ratio[H][S][V][b], and Ratio[H][S][V][c], respectively, the numbers of the constants a, the constants b, and the constants c in the array corresponding to the pixel are Ratio[H][S][V][a] *N, Ratio[H][S][V][b] *N, and Ratio[H][S][V][c] *N, respectively, where N is the length of the array corresponding to the pixel. Therefore, Ratio[H][S][V][a] *N:Ratio[H][S][V][b] *N:Ratio [H][S][V][c] *N=Ratio[H][S][V][a]:Ratio[H][S][V][b]:Ratio[H][S][V][c], that is, the ratios of the constants a, the constants b, and the constants c are the same as the ratios of red, white, and black, respectively. The array for each pixel may be easily created in the above manner, as shown in FIG. 10.

Figure 10:
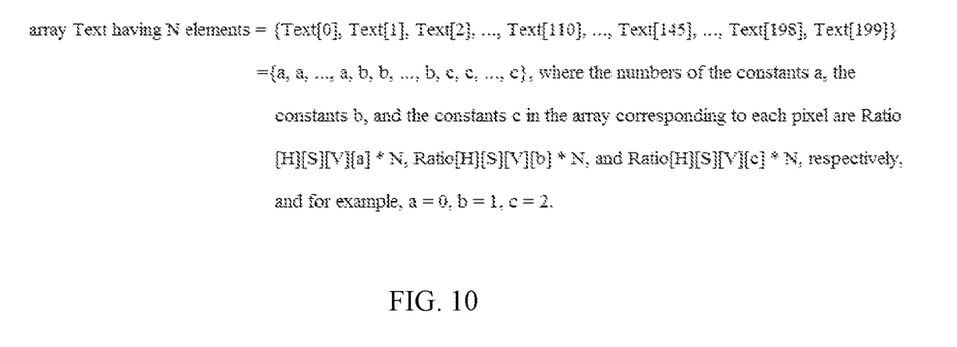
FIG. 10 is a schematic diagram showing an example array, which corresponds to a pixel and stores therein a plurality of constants each of which denotes a target value corresponding to the pixel, and for example may be created by step S03 or S203 to be described later, according to an embodiment of the present disclosure.

In some embodiments, in a case where each array stores the constants a, b and c, and where the constants a, b and c represent red, white and black, respectively, determining a color of a pixel of a converted image corresponding to each pixel of the to-be-converted image according to the acquired target value corresponding to the pixel of the to-be-converted image to acquire the converted image in step S05 may include: determining that the color of a pixel of the converted image corresponding to each pixel of the to-be-converted image is red, white or black in a case where the target value corresponding to the pixel of the to-be-converted image is the constant a, b or c, to acquire the converted image including three colors of red, white and black, as shown in FIG. 10.

Values of the constants a, b and c are not limited herein, and may be set in advance. In some embodiments, a=0, b=1, c=2, but the present disclosure is not limited thereto, as shown in FIG. 10.

In some embodiments, the first color space is the RGB color space and the second color space is the HSV color space.

The RGB color space is defined according to the additive color mixing principle. In the RGB color space, each color may be acquired by mixing red, green, and blue together. The color acquired by mixing red, green, and blue is similar to a color of light acquired by superimposing red light emitted from a red lamp, green light emitted from a green lamp, and blue light emitted from a blue lamp together, and a brightness of the color acquired by mixing red, green, and blue together is equal to a sum of brightness of red, green, and blue. That is, mixing red, green, and blue to acquire a color is an additive mixing.

Figure 3:
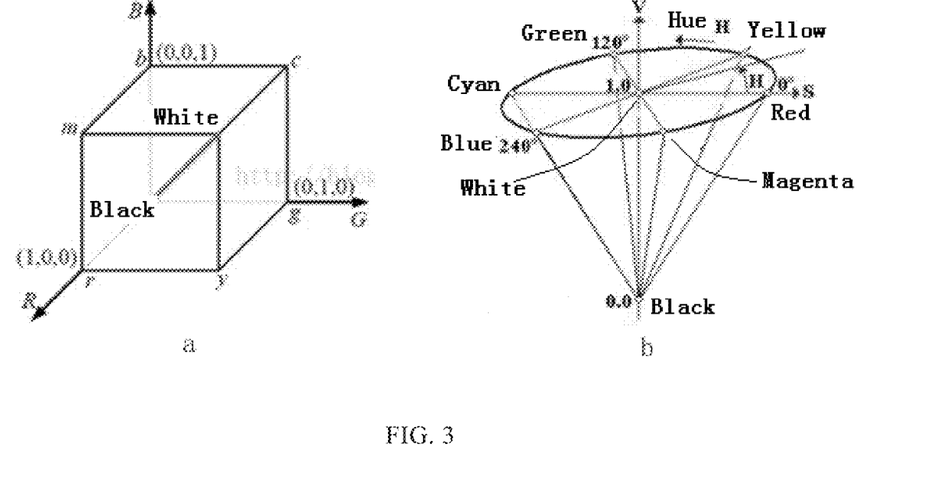

Specifically, each of red, green, and blue may be divided into 256 levels of brightness (which also referred to as "gray value"). The "lamp" is dimmest at the brightness of 0, which corresponds to the "lamp" being turned off. The lamp is brightest at the brightness of the 255. Mixing red, green and blue in a case where the brightness of red, green and blue are the same may result in a gray hue (i.e., gray tone), and different brightness values result in gray hues with different gray values. When the gray values of red, green and blue are all 0, black is acquired by mixing red, green and blue together; and when the gray values of red, green, and blue are all 255, white is acquired by mixing red, green and blue together. In the RGB color space, R, G, and B represent the brightness of red, the brightness of green, and the brightness of blue, respectively. In general, the value of R, G, or B is represented by an integer, and R∈[0, 255], G∈[0, 255], B∈[0, 255]. Part a of FIG. 3 is a schematic diagram showing the RGB color space. As shown in part a of FIG. 3, the RGB color space has a cubic shape in which the coordinate values of R, G and B have been normalized.

The HSV color space is a relatively intuitive color model that includes the following parameters for a color: Hue (H), Saturation (S), 暗 and Value (V). Part b of FIG. 3 is a schematic diagram showing the HSV color space. As shown in Part b of FIG. 3, the HSV color space has a cone shape. As shown in part b of FIG. 3, the Hue H is represented by an angle in the range of 0° to 360° (which may be abbreviated as 0 to 360). In general, the angle starts from red, and rotates in a counterclockwise direction. The angle of 0° means red, the angle of 60° means yellow, the angle of 120° means green, the angle of 180° means cyan, the angle of 240° means blue, and the angle of 300° means magenta. The Saturation S represents the degree to which a color approaches its corresponding spectral color. Each color may be regarded as a result of a mixture of its corresponding spectral color and white, thus the greater a ratio of the corresponding spectral color to the color is, the closer the color is to the corresponding spectral color and the higher the Saturation of the color is. The higher the Saturation is, the darker and brighter the color is. When the white component in the color is 0, the Saturation of the color is the highest. A value of the Saturation S usually ranges from 0% to 100% (which may be abbreviated as 0 to 100), and the larger the value of the Saturation S is, the more saturated the color is. The Value V represents the degree of brightness of the color. For a light source color, a value of the Value V depends on the brightness of a light emitting body; and for an object color, a value of the Value V depends on a transmittance or reflectance of the object. A value of the Value V is generally in the range of 0% (black) to 100% (white) (which may be abbreviated as 0 to 100).

A color may be converted from the RGB color space to the HSV color space by using the following formulas:

$$R^* = R/255, G^* = G/255, B^* = B/255$$

$$C_{max} = \max(R^*, G^*, B^*),$$

$$C_{min} = \min(R^*, G^*, B^*),$$

$$\Delta = C_{max} - C_{min}$$

$$H = \begin{cases} 0° & , \Delta = 0 \\ 60° \times \left(\frac{G° - B°}{\Delta} + 0\right) & , C_{max} = R° \\ 60° \times \left(\frac{B° - R°}{\Delta} + 2\right) & , C_{max} = G° \\ 60° \times \left(\frac{R° - G°}{\Delta} + 4\right) & , C_{max} = B° \end{cases}$$

$$S = \begin{cases} 0 & , C_{max} = 0 \\ \frac{\Delta}{C_{max}} & , C_{max} \neq 0 \end{cases}, V = C_{max}$$

In some embodiments, as described above, in the color ratio allocation table based on the second color space, the sum of the ratios of all the colors included in the target conversion color ratio corresponding to each pixel of the to-be-converted image is 1. In this way, the design difficulty of the color ratio allocation table of the second color space may be reduced, the development cost may be saved, and the information contained in the original image may be represented more comprehensively. For example, when a to-be-converted image is converted from a color image into a three-color image having red, white, and black, all target conversion colors corresponding to each pixel of the to-be-converted image are red, white, and black, and the sum of the ratios of red, white, and black is 1.

Figure 4:
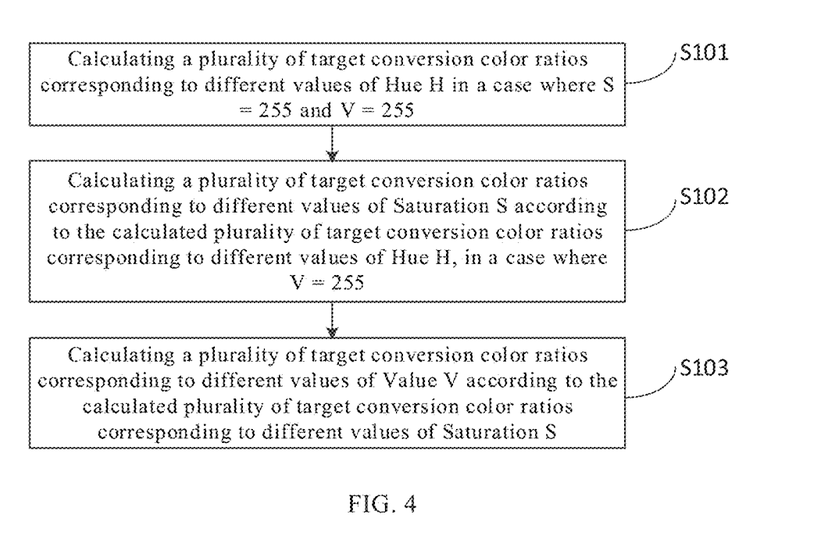
FIG. 4 shows a schematic flowchart of a method for creating an HSV color ratio allocation table according to an embodiment of the present disclosure.

In some embodiments, the second color space is the HSV color space, and the color ratio allocation table based on the second color space is the HSV color ratio allocation table. As shown in FIG. 4, the HSV color ratio allocation table may be created by the following method including steps S101 to S103.

In step S101, the Saturation S and the Value V are set as S=255, and V=255, and a plurality of target conversion color ratios corresponding to different values of the Hue H are calculated.

In step S102, in a case where the Value V is set as V=255, a plurality of target conversion color ratios corresponding to different values of the Saturation S are calculated according to the plurality of target conversion color ratios corresponding to different values of the Hue H calculated in step S101.

In step S103, a plurality of target conversion color ratios corresponding to different values of the Value V are calculated according to the plurality of target conversion color ratios corresponding to different values of the Saturation S calculated in step S102.

By steps S101 to S103, the HSV color ratio allocation table may be established in which, for any combination of values of H, S, and V, a corresponding target conversion color ratio may be found. It should be noted that, a specific method for calculating the target conversion color ratio in steps S101 to S103 is not limited herein, and the method for calculating the target conversion color ratio may be formulated according to characteristics of the target conversion colors.

In some embodiments, when the target conversion color ratios corresponding to each pixel of the to-be-converted image include the ratios of red, white, and black, the plurality of target conversion color ratios corresponding to different values of Hue H in step S101 may be calculated by the following set of formulas.

$$0 \leq H < 30, \text{Ratio}[H][255][255][0]=1-H/29, \text{Ratio}[H][255][255][1]=H/29, \text{Ratio}[H][255][255][2]=0;$$

$$30 \leq H < 60, \text{Ratio}[H][255][255][0]=0, \text{Ratio}[H][255][255][1]=1-(H-30)/29, \text{Ratio}[H][255][255][2]=(H-30)/29;$$

$$60 \leq H < 90, \text{Ratio}[H][255][255][0]=0, \text{Ratio}[H][255][255][1]=(H-60)/29, \text{Ratio}[H][255][255][2]=1-(H-60)/29;$$

$$90 \leq H < 120, \text{Ratio}[H][255][255][0]=0, \text{Ratio}[H][255][255][1]=1-(H-90)/29, \text{Ratio}[H][255][255][2]=(H-90)/29;$$

$$120 \leq H < 150, \text{Ratio}[H][255][255][0]=0, \text{Ratio}[H][255][255][1]=(H-120)/29, \text{Ratio}[H][255][255][2]=1-(H-120)/29;$$

$$150 \leq H < 180, \text{Ratio}[H][255][255][0]=(H-150)/29, \text{Ratio}[H][255][255][1]=1-(H-150)/29, \text{Ratio}[H][255][255][2]=0;$$

where Ratio[H][255][255][0], Ratio[H][255][255][1] and Ratio[H][255][255][2] represent respectively the ratios of red, white, and black when H=i, S=255, and V=255, and i∈[0, 180) and is a positive integer.

It is to be noted that when the target conversion color ratios corresponding to each pixel of the to-be-converted image include the ratios of red, white, and black, the to-be-converted image will be converted into a three-color image including red, white, and black.

Figure 5:
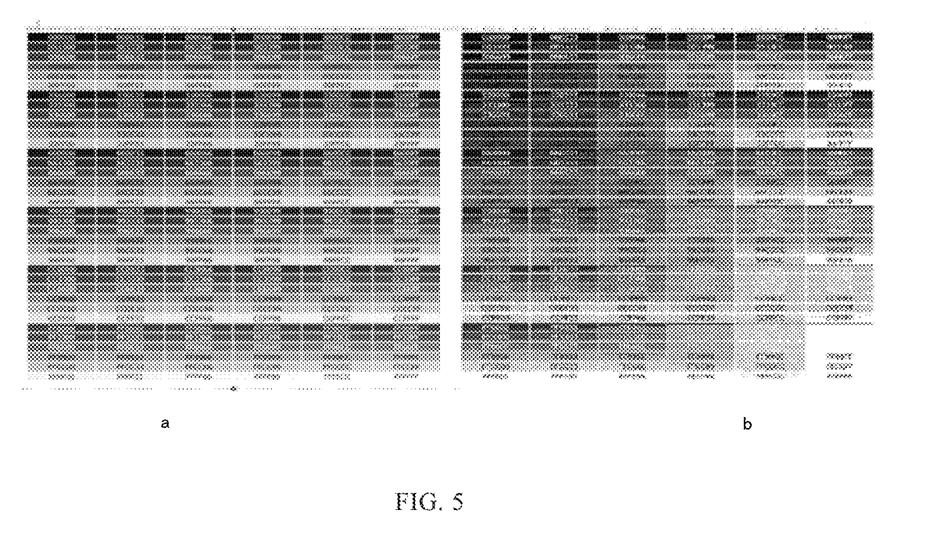

The three-color image including red, white and black represents different colors by using a degree of sparseness of red, white and black without gray change, and the process of generating the three-color image is a process of representing different colors. The three-color image can represent an RGB color image in a hierarchical manner. As shown in parts a and b of FIG. 5, part a of FIG. 5 shows original colors, and part b of FIG. 5 shows a three-color image corresponding to the original colors.

The above formulas for calculating the plurality of target conversion color ratios corresponding to different values of the Hue H in step S101 will be further described below.

Figure 6:
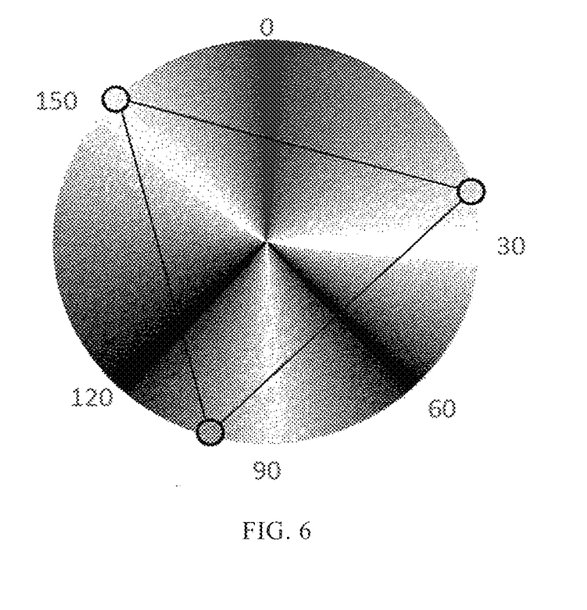
FIG. 6 is a color ratio schematic diagram showing ratios of red, white, and black corresponding to different values of Hue H when Saturation S=255 and Value V=255.

In some embodiments, the HSV color space is represented by using the opencv system that is well known to one of ordinary skill in the art. In the opencv system, H∈[0, 180), S∈[0, 255], and V∈[0, 255]. H∈[0, 180) in the opencv system and H∈[0, 360) in other systems is the same in the effect of representing colors. In embodiments of the present disclosure, description is made by taking H∈[0, 180], S∈[0, 255], and V∈[0, 255] as an example. In this case, red (i.e., red color) is relatively concentrated in the range of H values from 0 to 30 and from 150 to 179 in the HSV color space. In other ranges of the H value, black and white are mainly alternated; in this case, the ratio of white increases as the Saturation S decreases, and the ratio of black increases as the Value V decreases. Therefore, the above formulas for calculating the plurality of target conversion color ratios corresponding to different values of the Hue H in step 101 are so designed. FIG. 6 shows the color ratio allocation represented by the set of formulas. That is, the color ratio diagram shown in FIG. 6 is a schematic diagram showing the ratios of red, white, and black corresponding to different values of Hue H when the Saturation S=255 and the Value V=255.

Based on the above-described formulas for calculating the plurality of target conversion color ratios corresponding to different values of the Hue H in step S101, the plurality of target conversion color ratios corresponding to different values of the Saturation S in step S102 may be calculated according to the following set of formulas.

$$\text{Ratio}[H][S][255][0]=\text{Ratio}[H][255][255][0]*S/255,$$
$$\text{Ratio}[H][S][255][1]=\text{Ratio}[H][255][255][1]*S/255+(1-S/255), \text{Ratio}[H][S][255][2]=\text{Ratio}[H][255][255][2]*S/255;$$

where Ratio[H][S][255][0], Ratio[H][S][255][1] and Ratio[H][S][255][2] represent respectively the ratios of red, white and black when H=i, S=j, and V=255, where i∈[0, 180), j∈[0, 255], and i, j are positive integers.

It is to be noted that when V=255, the ratio of white gradually increases as the Saturation S decreases, and therefore the above formulas for calculating the plurality of target conversion color ratios corresponding to different values of the Saturation S in step S102 is so designed.

Based on the above formulas for calculating the plurality of target conversion color ratios corresponding to different values of the Saturation S in step S102, the plurality of target conversion color ratios corresponding to different values of the Value V in step S103 may be calculated according to the following set of formulas.

$$\text{Ratio}[H][S][V][0]=\text{Ratio}[H][S][255][0]*V/255, \text{Ratio}[H][S][V][1]=\text{Ratio}[H][S][255][1]*V/255, \text{Ratio}[H][S][V][2]=\text{Ratio}[H][S][255][2]*V/255+(1-V/255);$$

where Ratio[H][S][V][0], Ratio[H][S][V][1] and Ratio[H][S][V][2] represent respectively the ratios of red, white and black when H=i, S=j, V=k, where i∈[0, 180), j∈[0, 255], k∈[0, 255], and i, j, k are all positive integers.

It is to be noted that the ratio of black gradually increases as the Value V gradually decreases, and therefore the above formulas for calculating the plurality of target conversion color ratios corresponding to different values of the Value V in step S103 are so designed.

Figure 7:
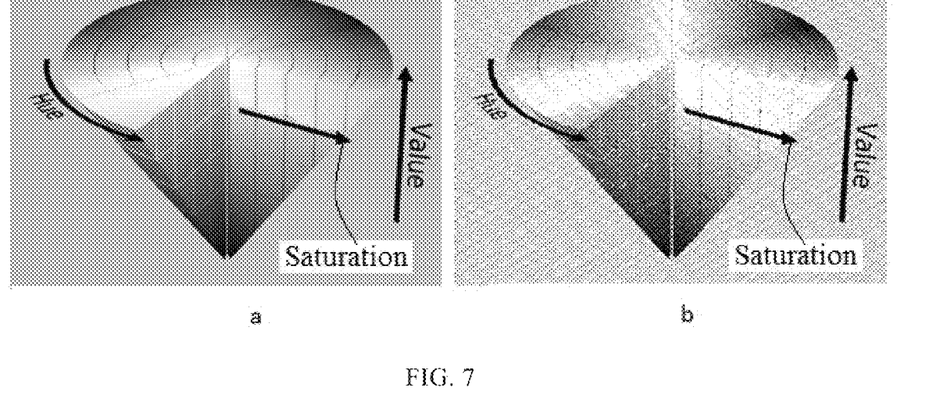

The design of the HSV color ratio allocation table may be completed through the three sets of formulas. By using this HSV color ratio allocation table, the ratios of red, white, and black corresponding to values of any one set of H, S, and V may be acquired directly according to the values of the set of H, S, and V. Part a of FIG. 7 is a schematic color diagram of the HSV color space, and part b of FIG. 7 shows the ratio allocation of red, white, and black corresponding to the HSV color space and acquired by using the above-described three sets of formulas.

The HSV color ratio allocation table may be named as "Ratio", and for convenience of representation, a four-dimensional matrix Ratio[180][256][256][3] may be used to describe the table Ratio. Here, matrix Ratio[180][256][256][3] indicates that 180 values of H, 256 values of S, 256 values of V, and 3 values representing colors are stored in the table, and the 3 values representing colors may be 0, 1 and 2, and represent red, white and black, respectively. Further, Ratio[i][j][k][0], Ratio[i][j][k][1] and Ratio[i][j][k][2] represent respectively the ratios of red, white and black when H=i, S=j, V=k, where i∈[0, 180], j∈[0, 255], k∈[0, 255], and i, j, k are all positive integers. It should be noted that the meanings represented by Ratio[i][j][k][0] and Ratio[H][S][V][0] are identical, and the latter can show the meaning of the variables more clearly. Similarly, the meanings represented by Ratio[i][j][k][1] and Ratio[H][S][V][1] are identical, and the meanings represented by Ratio[i][j][k][2] and Ratio[H][S][V][2] are identical.

The image representation method according to the above embodiments of the present disclosure will be further described in detail below with reference to specific examples.

In this example, the to-be-converted image SRC is a color image, and the to-be-converted image SRC needs to be converted into a three-color image including red, white, and black. The first color space of the to-be-converted image SRC is the RGB color space, and the second color space of the to-be-converted image SRC is the HSV color space. The color ratio allocation table of the second color space is the HSV color ratio allocation table Ratio acquired according to the above three sets of formulas. The target conversion color ratios include the ratios of red, white, and black, and the array corresponding to each pixel of the to-be-converted image is an array Text.

Figure 8:
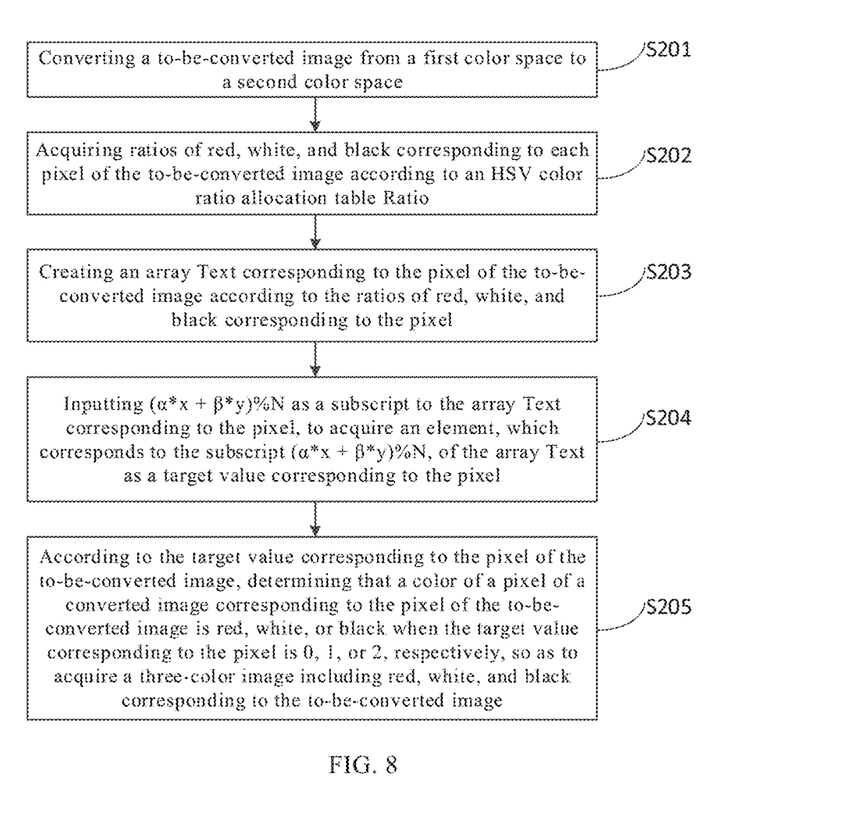
FIG. 8 shows a flowchart of an example of an image representation method according to an embodiment of the present disclosure.

In this example, as shown in FIG. 8, the image representation method according to an embodiment of the present disclosure may include the following steps S201 to S205.

In step S201, the input to-be-converted image SRC is converted from the RGB color space to the HSV color space.

In step S202, the ratios of red, white, and black corresponding to each pixel of the to-be-converted image are acquired according to the HSV color ratio allocation table Ratio. Specifically, the ratios of red, white, and black corresponding to each pixel may be acquired according to the row coordinate x and the column coordinate y of the pixel. That is, according to values of the H, S and V of each pixel of the to-be-converted image, the ratios of red, white, and black corresponding to the values of the H, S, and V are acquired based on the HSV color ratio allocation table Ratio. The sum of the ratios of red, white, and black is 1.

In step S203, an array Text corresponding to each pixel of the to-be-converted image is created according to the ratios of red, white, and black corresponding to the pixel acquired in step S202. The length of the array Text is N, and constants 0, 1 and 2 are stored in the array Text, where constant 0 represents red, constant 1 represents white, and constant 2 represents black.

Figure 11:
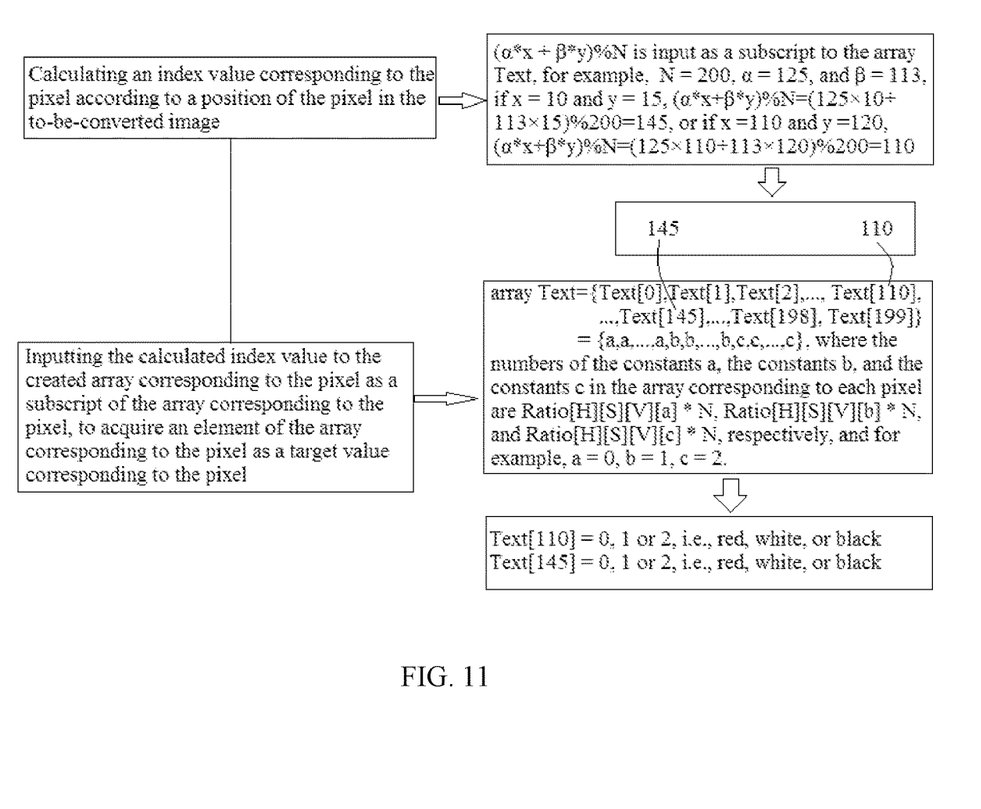
FIG. 11 is a schematic diagram showing steps of calculating an index value corresponding to a pixel according to a position of the pixel in a to-be-converted image, and inputting the calculated index value to the created array corresponding to the pixel as a subscript of the array corresponding to the pixel to acquire an element of the array corresponding to the pixel as a target value corresponding to the pixel, according to an embodiment of the present disclosure.

In step S204, $(\alpha*x+\beta*y) \% N$ is input as a subscript to the array Text corresponding to each pixel, to acquire an element, which corresponds to the subscript $(\alpha*x+\beta*y) \% N$, of the array Text as a target value corresponding to the pixel. That is, the element Text[$(\alpha*x+\beta*y) \% N$] in the array Text corresponding to each pixel is the target value corresponding to the pixel. Here, x and y are the row coordinate and the column coordinate of each pixel of the to-be-converted image, α and β are hyper-parameters, N is the length of the array Text, the values of α, β and N are in the same order of magnitude, and the symbol % represents the modulus operator. In addition, α and alpha have the same meaning, and β and beta have the same meaning, as shown in FIG. 11.

A process of acquiring a target value will be described below by taking N=200, α=125, and β=113 as an example.

If x=10 and y=15, $(\alpha*x+\beta*y) \% N = (125\times10+113\times15) \%200=145$, and the target value corresponding to the pixel having the coordinate (10, 15) in the to-be-converted image is Text[145], and the value of Text[145] is determined according to step S203. If Text[145]=0, 1 or 2, the target value corresponding to the pixel with coordinate (10, 15) in the to-be-converted image is 0, 1 or 2, respectively, as shown in FIG. 11.

If x=110 and y=120, $(\alpha*x+\$*y) \% N = (125\times110+113\times120)\% 200=110$, and the target value corresponding to the pixel having the coordinate (110, 120) in the to-be-converted image is Text[110], and the value of Text[110] is determined according to step S203. If Text[110]=0, 1 or 2, the target value corresponding to the pixel with coordinate (110, 120) in the to-be-converted image is 0, 1 or 2, respectively, as shown in FIG. 11.

In step S205, according to the target value corresponding to each pixel of the to-be-converted image acquired in step S204, when the target value corresponding to the pixel is 0, 1, or 2, a color of a pixel of a converted image corresponding to the pixel of the to-be-converted image is red, white, or black, respectively, so as to acquire a three-color image including red, white, and black corresponding to the to-be-converted image.

Figure 9:
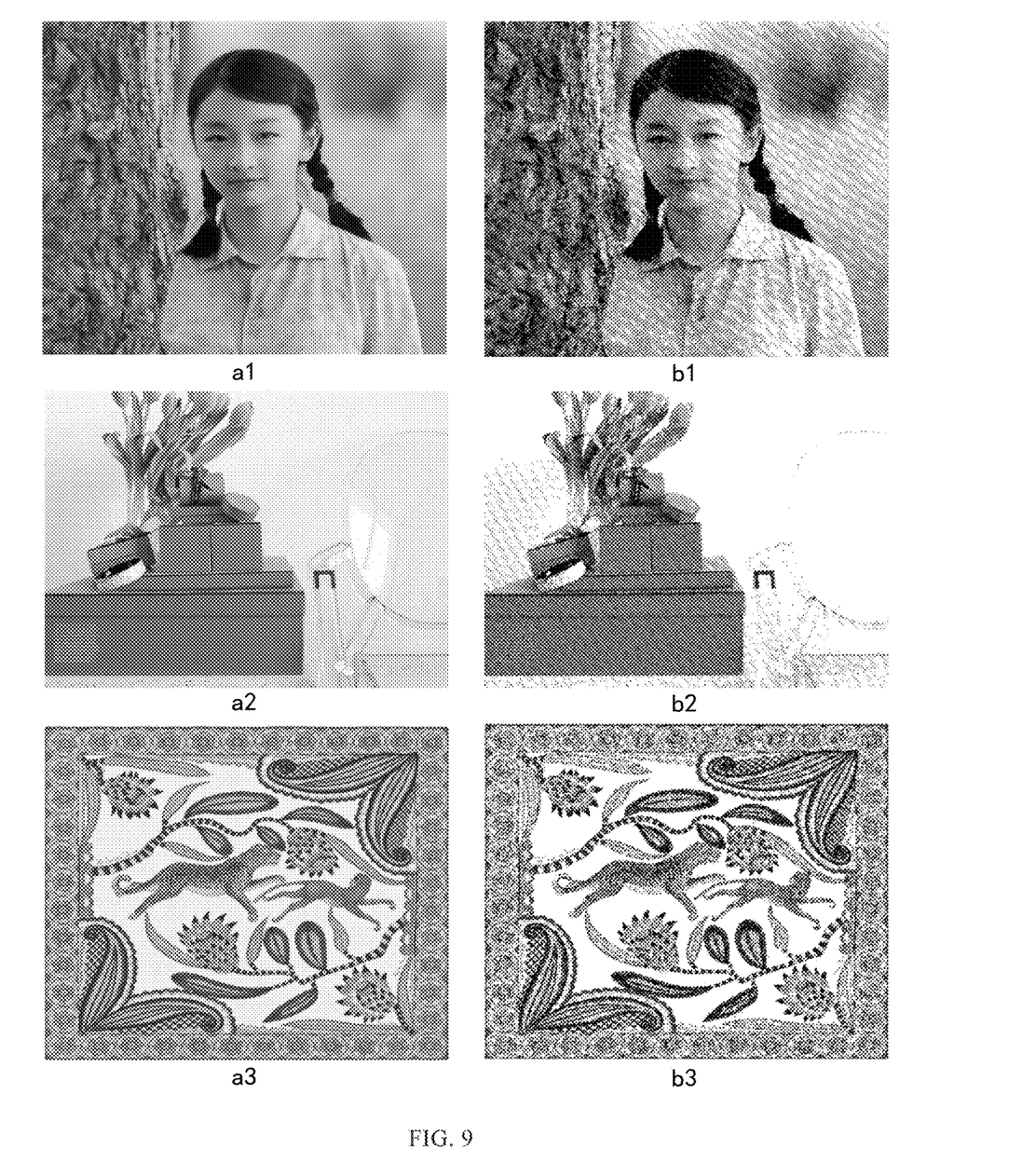

Parts b1 to b3 of FIG. 9 illustrate three-color images, which are the result converted from the images shown in parts a1 to a3 of FIG. 9, respectively, by using the image representation method according to the above embodiments of the present disclosure. That is, parts a1 to a3 of FIG. 9 are to-be-converted images, and parts b1 to b3 of FIG. 9 are converted images corresponding to parts a1 to a3 of FIG. 9, respectively. It can be seen that the converted images acquired by using the image representation method according to the embodiments of the present disclosure is clear, and have a good visual effect.

The converted image acquired by using the image representation method according to the embodiments of the present disclosure can clearly and comprehensively represent the visual information of the original color image, and can achieve a good display effect. The image representation method may be applied to the technical field of digital image processing, and particularly may be applied to a device including an electronic ink screen.

An embodiment of the present disclosure provides an image representation device including one or more processors and a memory for storing one or more programs. When the one or more programs are executed by the one or more processors, the image representation method in accordance with the embodiments of the present disclosure can be implemented by the one or more processors.

The image representation device provided by the embodiment of the present disclosure can implement the image representation method, and the converted image acquired by the image representation device is clear. Further, the image representation device can greatly relieve the case where a large area of the converted image have a same color, and can retain more visual information contained in the original image. Furthermore, the image representation device has good display effect and good user experience. The image representation device may include a display device such as an electronic ink screen, or may include any product or component having a display function and including an electronic ink screen and the like.

An embodiment of the present disclosure provides a non-transitory computer readable storage medium (e.g., known non-transitory computer storage medium such as an optical disc, a flash memory, or the like) having a computer program stored therein, and the computer program, when executed by a processor, enables the processor to implement the image representation method according to the embodiments of the present disclosure.

By executing the computer program stored in the non-transitory computer readable storage medium provided by the embodiment of the present disclosure, the image representation method according to the embodiments of the present disclosure can be realized, so that a converted image having a clear display effect and sufficiently reflecting visual information contained in the original image can be acquired.

One of ordinary skill in the art would appreciate that the present disclosure includes an apparatus (which, for example, includes an integrated circuit performing the above-described image representation method of the present disclosure) for performing one or more of the operations (or steps) described herein. The apparatus may be specially designed and manufactured for the required purposes, or may include application processors or known devices (e.g., a central processing unit, CPU) in general purpose computers. The apparatus may have computer programs stored therein that are selectively activated or reconfigured. Such computer programs may be stored in a storage medium of the apparatus (e.g., a computer) or in any other types of storage medium suitable for storing electronic instructions and respectively coupled to a bus. Such computer storage mediums include, but not limited to, any type of disk (including floppy disks, hard disks, optical disks, CD-ROMs, and magneto-optical disks), read-only memories (ROMs), random access memories (RAMs), erasable programmable read-only memories (EPROMs), electrically erasable programmable read-only memories (EEPROMs), flash memories, magnetic cards, or optical cards. That is, the storage mediums include any mediums in which information can be stored or from which information can be read by the apparatus (e.g., a computer).

It will be understood by one of ordinary skill in the art that, each of the blocks of the structural diagrams and/or block diagrams and/or flowcharts, and a combination of the blocks of the structural diagrams and/or block diagrams and/or flowcharts can be implemented through computer program instructions. One of ordinary skill in the art that will appreciate that, the computer program instructions may be executed by providing the computer program instructions to a general purpose computer, a special purpose computer, or any other processor employing a programmable data processing method, such that the computer or the other processor employing a programmable data processing method can perform the technical solutions indicated in one or more blocks of the structural diagrams and/or block diagrams and/or flowcharts of the present disclosure.

It should be understood that the above embodiments are merely exemplary embodiments of the present disclosure, and protection scope of the present disclosure is not limited thereto. It will be apparent to one of ordinary skill in the art that various changes and modifications may be made therein without departing from the technical scope of the present disclosure, and these changes and modifications also fall within the scope of the present disclosure. Therefore, the protection scope of the present disclosure shall be defined by the appended claims.

What is claimed is:

1. An image representation method, comprising:
    converting a to-be-converted image from a first color space to a second color space, so as to acquire a color ratio allocation table based on the second color space;
    acquiring a target conversion color ratio corresponding to each pixel of the to-be-converted image, according to the color ratio allocation table based on the second color space, wherein the target conversion color ratio includes ratios of a plurality of target conversion colors;
    creating an array corresponding to every pixel of the to-be-converted image according to the target conversion color ratio, wherein the array stores therein a plurality of constants each of which denotes a target value corresponding to each pixel;
    calculating an index value corresponding to any one pixel according to a position of the any one pixel in the to-be-converted image, and inputting the calculated index value as a subscript of a respective array corresponding to the any one pixel, to acquire an element of the respective array as a target value corresponding to the any one pixel; and
    determining a target conversion color of the any one pixel according to the acquired target value, to acquire a converted image comprising the plurality of target conversion colors and corresponding to the to-be-converted image, wherein the target value is a preset value denoting the target conversion color.

2. The image representation method according to claim 1, wherein calculating an index value corresponding to any one pixel according to a position of the any one pixel in the to-be-converted image as a subscript of the respective array comprises:
    calculating a first intermediate result according to a coordinate of the any one pixel in the to-be-converted image, and then performing a modulus operation by taking the first intermediate result as a dividend and taking N as a divisor to acquire the index value corresponding to the any one pixel as the subscript of the respective array, where N is a length of the respective array, wherein the first intermediate result is a weighted sum of row and column coordinates of the any one pixel of the to-be-converted image.

3. The image representation method according to claim 2, wherein calculating a first intermediate result according to a coordinate of the any one pixel in the to-be-converted image comprises:
    acquiring the first intermediate result by calculating $(\alpha*x+\beta*y)$, where x and y represent row and column coordinates, respectively, of the any one pixel of the to-be-converted image, $\alpha$ and $\beta$ are hyper-parameters, and values of $\alpha$, $\beta$ and N are in a same order of magnitude.

4. The image representation method according to claim 3, further comprising:
    storing a plurality of types of constants in the respective array, wherein each type of constant represents one of the target conversion colors and include a plurality of constants, the constants of a same type represent a same target conversion color, and the constants of different types each represent a corresponding target conversion color; and
    wherein in the respective array, a ratio of a number of the constants of one type to a total number of the constants of the plurality of types is the same as a ratio of the target conversion color corresponding to the constants of the one type to the plurality of target conversion colors.

5. The image representation method according to claim 4, wherein a constant a, a constant b and a constant c are stored in the respective array, where the constant a represents red, the constant b represents white, and the constant c represents black; and     determining the target conversion color of the any one pixel according to the acquired target value, to acquire a converted image comprising the plurality of target conversion colors and corresponding to the to-be-converted image comprises:

determining that a color of a pixel of the converted image corresponding to the any one pixel of the to-be-converted image is red, white, or black in a case where the target value corresponding to the any one pixel of the to-be-converted image is the constant a, the constant b or the constant c, respectively, to acquire the converted image comprising red, white and black.

6. The image representation method according to claim 5, wherein the first color space is an RGB color space, and the second color space is an HSV color space.

7. The image representation method according to claim 6, wherein in the color ratio allocation table, a sum of the ratios of the plurality of target conversion colors included in the target conversion color ratio corresponding to each pixel of the to-be-converted image is 1.

8. The image representation method according to claim 7, wherein the color ratio allocation table is an HSV color ratio allocation table; and     a method for creating the HSV color ratio allocation table comprises:

calculating a plurality of target conversion color ratios corresponding to different values of Hue H in a case where Saturation S and Value V are set as S=255 and V=255;

calculating a plurality of target conversion color ratios corresponding to different values of Saturation S according to the calculated plurality of target conversion color ratios corresponding to different values of Hue H, in a case where Value V is set as V=255; and     calculating a plurality of target conversion color ratios corresponding to different values of Value V according to the calculated plurality of target conversion color ratios corresponding to different values of Saturation S.

9. The image representation method according to claim 8, wherein the target conversion color ratio corresponding to each pixel of the to-be-converted image comprises ratios of three colors of red, white, and black; and     the plurality of target conversion color ratios corresponding to different values of Hue H are calculated according to a following set of formulas:

$$0 \leq H < 30, \text{Ratio}[H][255][255][0]=1-H/29, \text{Ratio}[H][255][255][1]=H/29, \text{Ratio}[H][255][255][2]=0;$$

$$30 \leq H < 60, \text{Ratio}[H][255][255][0]=0, \text{Ratio}[H][255][255][1]=1-(H-30)/29, \text{Ratio}[H][255][255][2]=(H-30)/29;$$

$$60 \leq H < 90, \text{Ratio}[H][255][255][0]=0, \text{Ratio}[H][255][255][1]=(H-60)/29, \text{Ratio}[H][255][255][2]=1-(H-60)/29;$$

$$90 \leq H < 120, \text{Ratio}[H][255][255][0]=0, \text{Ratio}[H][255][255][1]=1-(H-90)/29, \text{Ratio}[H][255][255][2]=(H-90)/29;$$

$$120 \leq H < 150, \text{Ratio}[H][255][255][0]=0, \text{Ratio}[H][255][255][1], (H-120)/29, \text{Ratio}[H][255][255][2]=1-(H-120)/29;$$

$$150 \leq H < 180, \text{Ratio}[H][255][255][0], (H-150)/29, \text{Ratio}[H][255][255][1]=1-(H-150)/29, \text{Ratio}[H][255][255][2]=0;$$

where Ratio[H][255][255][0], Ratio[H][255][255][1] and Ratio[H][255][255][2] represent the ratios of red, white, and black, respectively, when H=i, S=255, and V=255, and i∈[0, 180) and is a positive integer.

10. The image representation method according to claim 9, wherein the plurality of target conversion color ratios corresponding to different values of Saturation S are calculated according to a following set of formulas:

$$\text{Ratio}[H][S][255][0]=\text{Ratio}[H][255][255][0]*S/255, \text{Ratio}[H][S][255][1]=\text{Ratio}[H][255][255][1]*S/255+(1-S/255), \text{Ratio}[H][S][255][2]=\text{Ratio}[H][255][255][2]*S/255;$$

where Ratio[H][S][255][0], Ratio[H][S][255][1] and Ratio[H][S][255][2] represent the ratios of red, white and black, respectively, when H=i, S=j, V=255, and i∈[0, 180), j∈[0, 255], and i, j are positive integers.

11. The image representation method according to claim 10, wherein the plurality of target conversion color ratios corresponding to different values of Value V are calculated according to a following set of formulas:

$$\text{Ratio}[H][S][V][0]=\text{Ratio}[H][S][255][0]*V/255, \text{Ratio}[H][S][V][1]=\text{Ratio}[H][S][255][1]*V/255, \text{Ratio}[H][S][V][2]=\text{Ratio}[H][S][255][2]*V/255+(1-V/255);$$

where Ratio[H][S][V][0], Ratio[H][S][V][1] and Ratio[H][S][V][2] represent the ratios of red, white and black, respectively, when H=i, S=j, V=k, and i∈[0, 180), j∈[0, 255], k∈[0, 255], and i, j, k are positive integers.

12. An image representation device, comprising:
one or more processors; and
a memory for storing one or more computer programs, wherein the one or more computer programs, when executed by the one or more processors, cause the one or more processors to implement the image representation method according to claim 1.

13. A non-transitory computer readable storage medium encoded with a computer program, wherein the computer program, when executed by a processor, implements the image representation method according to claim 1.

\* \* \* \* \*